United States Patent Office 3,585,239
Patented June 15, 1971

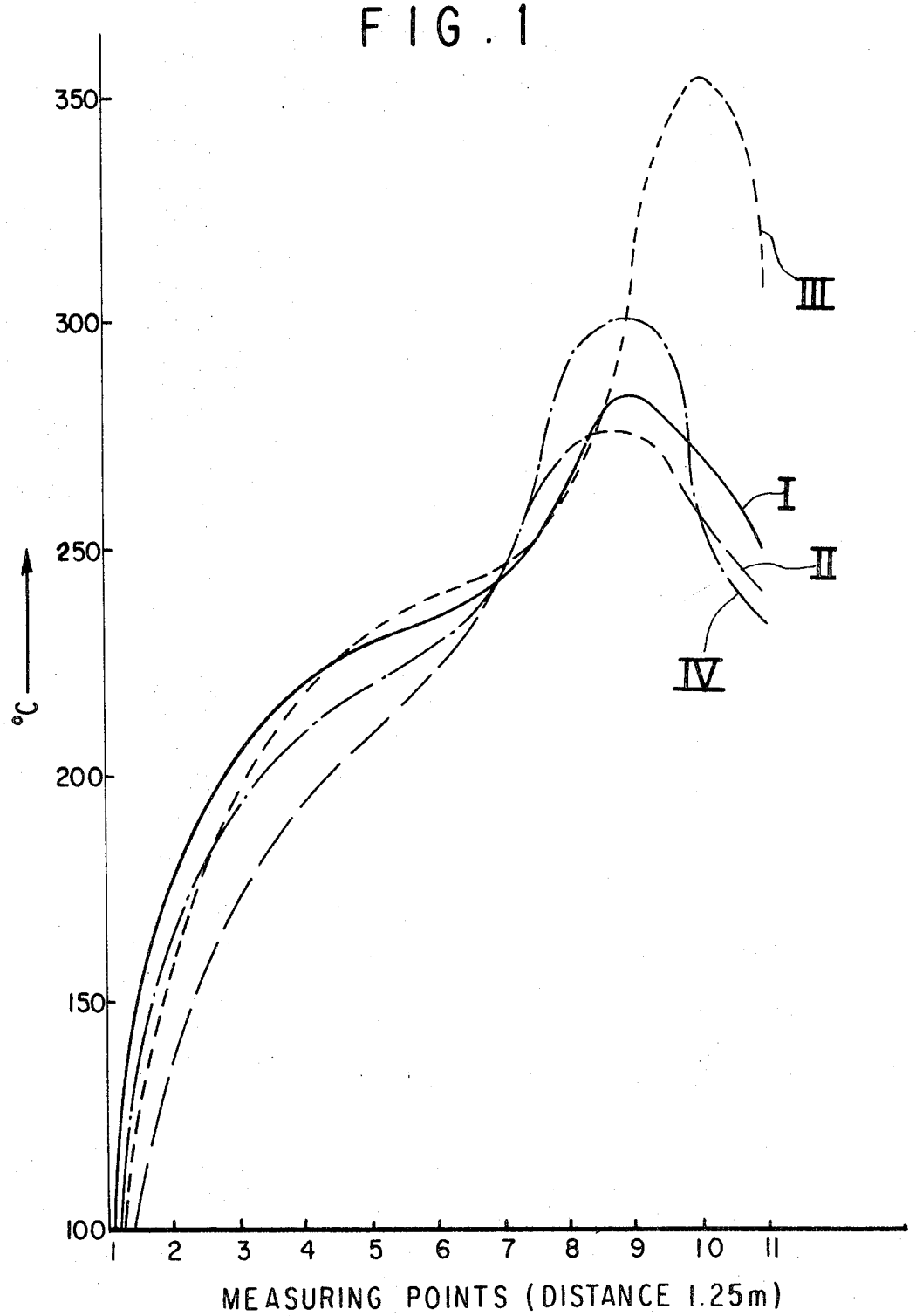

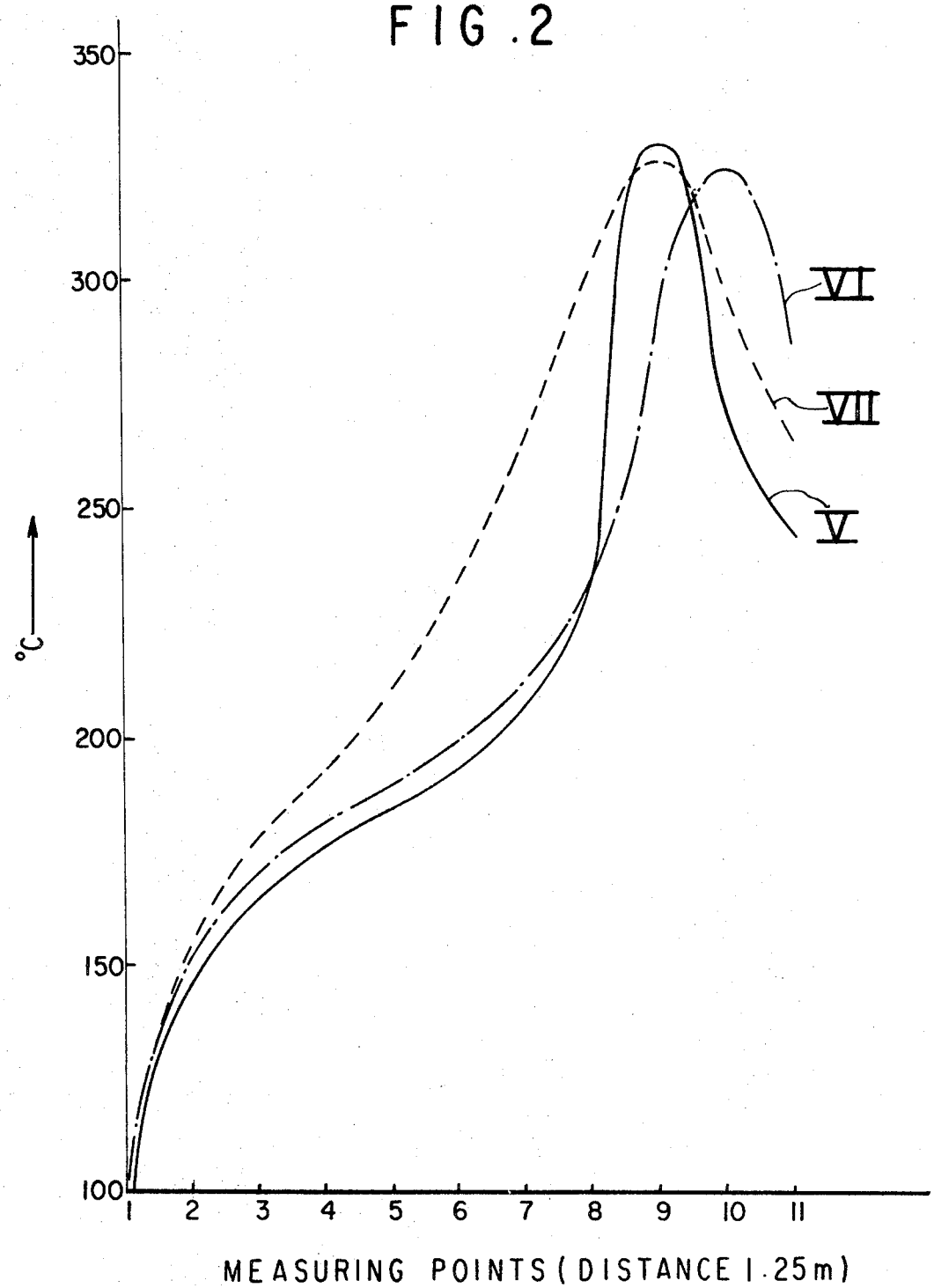

3,585,239
PROCESS FOR THE CONTINUOUS PREPARATION OF ADDITION PRODUCTS OF ETHYLENE OXIDE TO AMINES
Werner Stein, Erkrath, Unterbach, and Wilfried Umbach, Langenfeld, Rheinland, Germany, assignors to Henkel & Cie GmbH, Dusseldorf, Holthausen, Germany
Filed July 19, 1968, Ser. No. 746,164
Claims priority, application Germany, Oct. 4, 1967, H 64,076
Int. Cl. C07c 89/02
U.S. Cl. 260—563   9 Claims

ABSTRACT OF THE DISCLOSURE

This invention relates to a process for the continuous production of ethoxylated amines by (a) continuously passing a mixture of (1) organic compounds having reactive hydrogen atoms selected from the group consisting of primary amines, secondary amines, addition products of ethylene oxide thereof, addition products of propylene oxide thereof and addition products of butylene oxide thereof, with (2) ethylene oxide in a molar ratio of 1:1 to 1:6 under a pressure at which the reaction mixture is kept in liquid form, through a jacketed reactor having a small cross-section compared to its length, (b) heating said mixture to such a degree that, after travelling through the first half of said jacketed reactor, a maximum temperature of about 240° C. is attained, and that in the second half of said jacketed reactor said mixture passes through a maximum temperature of between about 250° to 360° C. (c) maintaining said mixture in said jacketed reactor for about 10 to 150 seconds, (d) maintaining the interval between the obtention of said highest maximum temperature and the time said mixture leaves said jacketed reactor between about 5% to 30% of the total duration of time said mixture is maintained in said jacketed reactor, (e) cooling said addition product to a temperature below 150° C., immediately after said addition product leaves said jacketed reactor, and (f) recovering said addition product. The ethoxylated amines so produced are obtained in a purer and practically colorless form as compared with prior art processes.

THE PRIOR ART

From the literature several processes are known for the continuous ethoxylation of organic substances. However, only two processes are known by means of which a continuous ethoxylation of amine-nitrogen-containing organic substances can be carried out. According to the German Pat. 855,111, the alkoxylation is carried out by continuously introducing an alkylene oxide with a boiling point below 200° C., together with an inert gas, into a reaction zone into which an organic compound with at least one active hydrogen atom and at least six carbon atoms is continuously sprayed in a finely dispersed form. Thereby a part of the alkylene oxide reacts with the organic compound. The reaction products obtained are cooled and are returned to the reaction zone until the desired number of alkylene oxide group have been introduced into the organic compound. The process is carried out at normal pressure and temperatures between 50° and 200° C.

In the German Auslegeschrift 1,180,370 a continuous process for alkoxylation of compounds with one active hydrogen atom, for instance, oleylamine is described, in which the organic compounds, liquid under normal circumstances, which can be alkoxylated, are allowed to trickle into a reaction vessel over packing material in the presence of catalysts and at temperature between 20° to 200° C., and are treated with an alkylene oxide at a pressure below the liquefying pressure of the alkylene oxide at the employed temperature.

Due to the relatively low temperatures and pressures, the space-time yields of the two processes are low: thus, for instance, a space-time yield of 3.7 liters of end product per hour is obtained in Example 4 of the German Auslegeschrift 1,180,370 in the reaction of oleylamine with ethylene oxide.

An increase of the space-time yield by means of a simultaneous increase of the temperature and pressure utilized in the alkoxylation of amino nitrogen containing substances has not previously been possible. As is well known, amines may become discolored upon being heated, even without other reactants present, and accordingly produce unsatisfactory end products in discontinuous alkoxylation processes which are carried out at relatively low temperatures.

OBJECTS OF THE INVENTION

An object of the present invention is the development of a process for the continuous production of addition products of ethylene oxide with organic amine compounds having reactive hydrogen atoms comprising in combination the following steps: (a) continuously passing a mixture of (1) organic compounds having reactive hydrogen atoms selected from the group consisting of primary amines, secondary amines, addition products of ethylene oxide thereof, addition products of propylene oxide thereof and addition products of butylene oxide thereof, with (2) ethylene oxide in a molar ratio of 1:1 to 1:6 under a pressure at which the reaction mixture is kept in liquid form, through a jacketed reactor having a small cross-section compared to its length, (b) heating said mixture to such a degree that, after travelling through the first half of said jacketed reactor, a maximum temperature of about 240° C. is attained, and that in the second half of said jacketed reactor, said mixture passes through a maximum temperature of between about 250° to 360° C., (c) maintaining said mixture in said jacketed reactor for about 10 to 150 seconds, (d) maintaining the interval between the obtention of said highest maximum temperature and the time said mixture leaves said jacketed reactor between about 5% to 30% of the total duration of time said mixture is maintained in said jacketed reactor, (e) immediately cooling said addition product to a temperature below 150° C., after said addition product leaves said jacketed reactor, and (f) recovering said addition product.

Another object of the present invention is the obtention of practically colorless addition products of ethylene oxide with organic amine compounds having reactive hydrogen atoms in high yields with very brief reaction time.

These and other objects of the invention will become more apparent as the description thereof proceeds.

DESCRIPTION OF THE INVENTION

It was startling to discover now that with very short duration and at relatively high reaction temperatures, high-grade, mostly transparent and nearly odorless products having a small content of by-products were obtainable on continuously reacting ethylene oxide with organic amine compounds having reactive hydrogen atoms, provided the following conditions are observed:

(a) Primary amines, secondary amines, or addition products of ethylene oxide, or of propylene oxide, or of butylene oxide to the compounds mentioned, are passed with ethylene oxide in a molecular ratio of 1:1 to 1:6, preferably from 1:1 to 1:4, under a pressure which maintains the reaction mixture in liquid form and optionally in the presence of the usual alkaline addition catalysts, through reactors with a small cross-section compared to the length, which are enclosed in a heat exchanger.

(b) The mixture is heated in a manner that, after travelling through the first half of the zone of the reactor enclosed in the heat exchanger, a maximum temperature of 240° C. is obtained, and that in the second half of this zone, the mixture attains a maximum temperature of between about 250° C. and 360° C.

(c) The duration of passage of the reaction mixture through the zone of the reactor surrounded by the heat exchanger amounts to about 10 to 150 seconds, preferably 20 to 100 seconds.

(d) The time between obtaining the maximum temperature and leaving the zone of the reactor surrounded by the heat exchanger does not amount to more than 5 to 30% of the entire duration of the passage of the reaction mixture through the reaction zone.

(e) Immediately after leaving the zone of the reactor surrounded by the heat exchanger, the end product is cooled to a temperature below 150° C.

In the drawings, FIGS. I and II show the reaction temperature curves of some of the various examples.

Serving as starting substances for the process of the invention are primarily mono- or multivalent aliphatic primary and secondary amines having a reactive hydrogen atom attached to the amino nitrogen and from 6 to 22 carbon atoms. The amines can have alkyl or alkenyl radicals which can be straight or branched. Examples of such compounds are n-hexylamine, N-methylhexylamine, hexamethylendiamine, n-dodecylamine, N-methyldodecylamine, hexadecylamine, docosylamine, 3-aminooctane, 3-methyloctylamine-1, oleylamine and erucylamine. The corresponding mixtures of amines can be employed as well, in particular those amines mixtures which are obtained from natural fats in a known way, for instance, coconut amine, tallow amine, etc. Furthermore, amines containing cycloaliphatic or aromatic residues can be employed, for instance, cyclohexylamine, phenyl-lower alkyl amines having 7 to 12 carbon atoms, such as benzylamine.

Further suitable starting materials are amines in which the alkyl chains are substituted by OH-groups or are interrupted by ether groups. As examples of these are, in particular, the ethylene oxide, propylene oxide or butylene oxide adducts of the amines.

If more than 6 mols of ethylene oxide are to be added to the said amines, then it is useful to add the desired amount of ethylene oxide in two or more stages, where the reaction product of the first stage serves as the starting material for the following stage or stages.

If the reaction is accelerated catalytically, the alkaline catalysts common for alkoxylations can be utilized.

These alkaline catalysts are, for example, alkali metal hydroxide, such as sodium or potassium hydroxide, alkali metal alcoholates or phenolates or metallic sodium or potassium. As a rule, as is customary, the amount of the catalyst ranges between 0.01% to 1%, preferably between 0.05% to 0.3% by weight of alkali metal, based on the weight of the starting compounds to which ethylene oxide is to be added. It is of advantage to use anhydrous catalysts and, in the case of using caustic alkalis, to remove the water formed during the formation of the alcoholate from the mixture. Furthermore, it is advantageous when using alkali alcoholates of lower alcohols, to distill the latter prior to the reaction with ethylene oxide.

The pressure in the reactor should be selected so that the reaction mixture will always be in liquid form even at the elevated reaction temperatures of the invention. The pressure ranges advantageously between 50 and 100 atmospheres excess pressure.

The reaction is conducted in vessels which have a small cross-section in comparison with their length. For example, pressure tubes having a diameter of about 3 to 12 mm., preferably of about 5 to 10 mm., are suitable. Instead of these tubes, so-called ring-slit reactors may be used or reactors with an oval cross-section of an oblate form chosen at random. In any case, the reaction vessels should be of such a dimension as to render a sufficient heat exchange possible.

The length of the reactors may amount, for example, to 10 to 100 meters when a tubular reactor is used.

The actual reaction zone or reaction vessel is encircled by a heat exchanger which, on the one hand, renders a rapid heating of the reaction mixture possible at the start of the reaction and which, on the other hand, guarantees a sufficiently rapid evolution of the heat developed during the strongly exothermic reaction. The heat exchanger may be subdivided into several zones adjusted to various temperatures. However, this measure is not absolutely necessary. It has been found advantageous to use a single zoned heat exchanger. This can be filled with water and adjusted to the desired temperature by means of regulation by pressure. In this manner, due to the high heat of evaporation of the water, a specially effective cooling is attained. Instead of water, however, different media may be employed. The temperature of the heat exchanger is, as a rule, maintained between about 160° C. and 240° C.

The temperature pattern during the reaction in a specific apparatus can be controlled by the temperature of the heat exchanger, by the flow rate of the reaction mixture and by the type and amount of the catalyst chosen. It should be taken into consideration that the development of heat of the reaction mixture is considerably accelerated in proportion to an increasing content of ethylene oxide. Likewise, at an identical molecular ratio, more heat is liberated during the reaction of low molecular weight starting substances with ethylene oxide at identical reaction volume than when high molecular weight starting substances are used.

Since, in general, the starting material, the amount of the ethylene oxide to be added and the catalyst amount are known, and the reaction follows a known temperature progress, the temperature progress of the reaction can easily be adjusted by regulating either the flow rate or the duration of the reaction mixture in the reactor and the temperature in the heat exchanger or both. For this purpose it is only necessary to measure the reaction temperatures in the various sections of the reaction vessel and to adjust either the flow rate or the temperature in the heat exchanger or both, to effect the optimum continuous reaction.

The reaction mixture is first heated in such a manner that in the first half of the zone of the reactor, encircled by the heat exchanger, a maximum reaction temperature of 240° C. is obtained. The temperature of the heat exchanger is controlled in such a way that the reaction mixture in the second half of this zone attains a maximum temperature between about 250° C. and 360° C., and thereafter the temperature of the reaction mixture within the reactor drops slightly.

It may be of advantage to pre-heat the starting products either separately or combined as a mixture. The flow rate of the reactants is regulated in such a way that the duration of passage of said mixture through the reaction zone lasts about 10 to 150 seconds, preferably 20 to 100 seconds. Attention should be paid to the fact that with increased temperatures in the heat exchanger, the duration of passage of the reaction mixture through the reactor has to be shortened.

The progress of the reaction of the reactants can easily be followed by determining the course of the curve of the internal temperature of the reactor by measuring of temperatures at various points over the length of the reactor. It has been discovered that an optimal yield of pure and light-colored end product is obtained when the product passage in the reaction zone between the time of attaining the highest maximum temperature and leaving the heated zone does not amount to more than about 5 to 30% of the total duration of passage of the reactants through the reaction zone.

Furthermore, it is essential to cool the reaction product immediately after leaving the heated zone to temperatures below 150° C., otherwise an increasing discoloration of the product is noted.

The reaction products are obtained in an almost colorless and very pure form with a high space-time yield.

It is particularly surprising that at the high working temperatures which, due to undesired side reactions, would be expected to lead to discoloration of the final product upon ethoxylation of less sensitive substances, do not have and adverse effect on the end product upon the ethoxylation of those amines which are well known for being particularly thermally unstable. Quite to the contrary, the products of the process have a color quality and purity which is superior to that of those products which were obtained at considerably lower temperatures and in a discontinuous process.

The products obtained may be utilized as textile assistants or as raw materials for the preparation of liquid or solid washing and cleansing agents.

The following examples are illustrative of the invention and enable better comprehension thereof. They are not, however, to be deemed limitative in any degree.

EXAMPLES

The experiments on which the following examples are based were carried out with a coil reactor which had an internal diameter of 9 mm. and a length of 12.5 m., and with every 1.25 m. length of the coil a temperature measuring point was provided. The reactor was surrounded by a heat exchanger filled with water. The temperature inside the heat exchanger was regulated in such a way that the pressure was kept constant by means of a pressure-relief valve. At the same time the heat of reaction was carried off through evaporating water. The vapor, escaping through the valve, was condensed in a cooling vessel under normal pressure and then pumped back into the apparatus to maintain a constant water level in the pressure jacket. The water level was adjusted in such a way that the entire coil of the tube was always surrounded by water as otherwise the heat transfer will not be sufficient.

To bring the amine reactant, ethylene oxide, mixture fed into the reactor to a reaction temperature as rapidly as possible, the circulating water was preheated and further heat was supplied to the pressure cooler by means of a steam heated coil.

Into the system of the pressurized heat exchanger a circulating pump was installed in such a manner that the water located in the surroundings of the front part of the reactor coil and which slowly loses temperature due to the continuous addition of new starting material, is pumped into that part of the heat exchanger where the highest temperatures prevail, which are caused by the exothermic reaction.

For the preparation of the mixture, the amine and ethylene oxide were pumped immediately prior to being fed into the reactor, by means of suitable dosing pumps through separate inlet pipes into a mixing chamber which ensured a thorough mixing. The pressure within the reactor was kept between approximately 50 to 100 atmospheres excess pressure. The starting material to be alkoxylated was preheated to approximately 120° C.

The finished reaction product was cooled by means of a pressure cooler to below 150° C. and was depressurized in an evaporation vessel.

EXAMPLE 1 n-Dodecylamine and ethylene oxide in a mol ratio of 1:1 (weight ratio of 4.2:1) were pumped through the reactor coil at such a rate that 30.4 kg./hour of the addition product of 1 mol of ethylene oxide to 1 mol of n-dodecylamine were formed in a quantitative reaction. The pressure of the pressurized water-containing heat exchanger was adjusted to a pressure of 29 atmospheres and the pressure present in the reactor was adjusted to a pressure of 90 to 100 atmospheres. The peak temperature in the reactor was 284° C. and the duration of progress of the product in the reactor lasted 74 seconds. The temperature course of the reaction is shown in curve I in FIG. 1 of the drawings.

The following color values were obtained on measuring the practically colorless final product in a Lovibond tintometer (4″-cup, 70° C.): yellow=2.5, red=0.5, blue=0. The correspondingly measured color values of the starting amine were: yellow=1.1, red=0.1, blue=0.

If the same reaction is carried out in a discontinuous process according to methods known from the literature in an autoclave with the same starting materials utilizing a peak temperature of 141° C. and a pressure of between 1.3 and 10.5 atmospheres for a reaction time of 2¼ hours, the resulting final product had Lovibond color values measured under the above described conditions: yellow=7.2, red=2.2, blue=0.

EXAMPLE 2 n-Dodecylamine was admixed with an amount of a 30% sodium methylate solution so that after the methanol has been evaporated in vacuum at 80° to 100° C., the amine contained 0.05% by weight of sodium. The catalyst-containing amine and ethylene oxide in a mol ratio of 1:1 (weight ratio of 4.2:1) were pumped through the reactor coil at such a rate that 54.5 kg./hour of the addition product of 1 mol of ethylene oxide to 1 mol of n-dodecylamine were formed in a quantitative reaction. The pressure of the pressurized water-containing heat exchanger was adjusted to a pressure of 26 atmospheres and the pressure present in the reactor was adjusted to a pressure of 60 to 65 atmospheres. The peak temperature in the reactor was 277° C. and the duration of progress of the reactants in the reactor was 41 seconds.

The temperature course of the reaction is shown in curve II in FIG. 1.

The practically colorless products had the following Lovibond color values, measured according to Example 1: yellow=3.0, red=0.9, blue=0. The color values of the starting amine admixed with 0.05 percent by sodium and measured under the same conditions were: yellow=3.0, red=1.0, blue=0.

If the same reaction is carried out in a discontinuous process according to methods known from the literature in an autoclave with the same catalyst-containing starting materials utilizing a peak temperature of 141° C. and a pressure of between 1.1 and 12 atmospheres for a reaction time of 3¼ hours, the resulting final product had the Lovibind color values, measured under the same conditions as in Example 1: yellow=6.5, red=1.1, blue=0.

EXAMPLE 3 n-Dodecylamine and ethylene oxide in a mol ratio of 1:2 (weight ratio 2.1:1) were pumped through the reactor coil at such a rate that 41 kg./hour of the addition product of 2 mols of ethylene oxide to 1 mol of n-dodecylamine were formed in a quantitative reaction. The pressure of the pressurized water-containing heat exchanger was adjusted to a pressure of 36 atmospheres and the pressure present in the reactor was adjusted to a pressure of 95 to 100 atmospheres. The peak temperature in the reactor was 355° C. and the duration of progress of the reactants in the reactor was 55 seconds.

The temperature course of the reaction is shown in curve III in FIG. 1.

The practically colorless product had the following Lovibond color values measured under the conditions of Example 1: yellow=3.0, red=0.7, blue=0. The correspondingly measured color values of the starting amine were: yellow=1.1, red=0.1, blue=0.

If the same reaction is carried out in a discontinuous process according to methods known from the literature in an autoclave with the same starting materials utilizing a peak temperature of 144° C. and a pressure of between 1.1 and 11 atmospheres for a reaction period of 5 hours, the resulting final product had the Lovibond color values measured under the conditions of Example 1: yellow=26.0, red=7.0, blue=0.

EXAMPLE 4 n-Dodecylamine was admixed with an amount of a 30% sodium methylate solution such that the amine contained 0.05% by weight of sodium after the methanol had been evaporated in vacuum at 80° to 100° C. The catalyst-containing amine and ethylene oxide in a mol ratio of 1:2 (weight ratio of 2.1:1) were pumped through the reactor coil at such a rate that 30.4 kg./hour of the addition product of 2 mols of ethylene oxide to 1 mol of n-dodecylamine were formed in a quantitative reaction. The pressure of the pressurized, water-containing heat exchanger was adjusted to a pressure of 22 atmospheres and the pressure present in the reactor was adjusted to a pressure of 85 to 95 atmospheres. The peak temperature in the reactor was 302° C. and the duration of progress of the reactants in the reactor was 74 seconds.

The temperature course of the reaction is shown in curve IV in FIG. 1.

The Lovibond color values of the practically colorless final product, measured according to Example 1 were: yellow=2.0, red=0.2, blue=0. The correspondingly measured color values of the starting amine admixed with 0.5% by weight of sodium were: yellow=3.0, red=1.0, blue=0.

If the same reaction is carried out in a discontinuous process according to methods known from the literature in the autoclave with the same catalyst-containing starting materials utilizing a peak temperature of 141° C., and a pressure of between 1.1 and 12 atmospheres for a reaction period of 4½ hours, the resulting final product had the Lovibond color values, measured under the abovedescribed conditions: yellow=25.0, red=5.9, blue=0.

EXAMPLE 5

A darkly-colored technical coconut amine mixture having the chain lengths of $C_8$ to $C_{18}$ was admixed with an amount of a 30% sodium methylate solution such that the amine contained 0.1% by weight of sodium after the methanol had been evaporated in vacuum at 80° to 100° C. The catalyst-containing amine and ethylene oxide in a mol ratio of 1:1 (weight ratio of 4.5:1) were pumped through the reactor coil at such a rate that 78.2 kg./hour of the addition product of 1 mol of ethylene oxide to 1 mole of coconut amine were formed in a quantitative reaction. The pressure of the pressurized, water-containing heat exchanger was adjusted to a pressure of 26 atmospheres and the pressure present in the reactor was adjusted to a pressure of 100 atmospheres. The peak temperature in the reactor was 264° C., and the duration of progress of the reactants in the reactor was 29 seconds.

The Lovibond color values of the darkly-colored product, measured according to Example 1, yede: yellow=27.9, red=7.0, blue=0. The color values of the technical coconut amine admixed with 0.1% per weight of sodium, which were measured in the same way, were: yellow=27.9, red=6.0, blue=2.3.

EXAMPLE 6

A darkly-colored technical coconut amine mixture having chain lengths of $C_8$ to $C_{18}$ was admixed with an amount of a 30% sodium methylate solution such that the amine contained 0.1% by weight of sodium after the methanol had been evaporated in vacuum at 80° to 100° C. The catalyst-containing amine and ethylene oxide in a mol ratio of 1:3 (weight ratio of 1.5:1) were pumped through the reactor coil at such a rate that 35.7 kg./hour of the addition product of 3 mols of ethylene oxide to 1 mol of coconut amine were formed in a quantitative reaction. The pressure of the pressurized water-containing heat exchanger was adjusted to a pressure of 9.5 atmospheres and the pressure present in the reactor was adjusted to a pressure of 50 to 65 atmospheres. The peak temperature in the reactor was 330° C. and the duration of progress of the reactants in the reactor was 63 seconds.

The temperature course of the reaction is shown in curve V in FIG. 2.

The Lovibond color values of the darkly-colored product, measured according to Example 1, were: yellow=27.9, red=4.2, blue=0. The color values, measured in the same way, of the starting amine admixed with 0.1% by weight of sodium were: yellow=27.9, red=6.0, blue=2.3.

EXAMPLE 7 n-Hexylamine and ethylene oxide in a mol ratio of 1:2 (weight ratio of 1.15:1) were pumped through the reactor coil at such a rate that 80 kg./hour of the addition product of 2 mols of ethylene oxide to 1 mol of n-hexylamine were formed in a quantitative reaction. The pressure of the pressurized water-containing heat exchanger was adjusted to a pressure of 25 atmospheres and the pressure present in the reactor was adjusted to a pressure of 70 to 80 atmospheres. The peak temperature in the reactor was 314° C. and the duration of progress of the reactants in the reactant was 27 seconds.

The practically colorless product had Lovibond color values, measured under the same conditions as Example 1: yellow=3.5, red=0.3, blue=0. The correspondingly measured color values of the starting amine were: yellow=3.3, red=0.4, blue=0.

If the same reaction is carried out in a discontinuous process according to methods known from the literature in an autoclave with the same starting materials utilizing a peak temperature of 140° C. and a pressure of between 1 and 10 atmospheres for a reaction period of 3½ hours, the resulting final product had the Lovibond color values, measured under the conditions of Example 1: yellow=24.5, red=6.9, blue=0.

EXAMPLE 8

Erucylamine was admixed with an amount of a 30% sodium methylate solution such that the amine contained 0.1% by weight of sodium after the methanol had been evaporated in vacuum at 80° to 100° C. The catalyst-containing amine and ethylene oxide in a mol ratio of 1:4 (weight ratio of 1.8:1) were pumped through the reactor coil at such a rate that 46 kg./hour of the addition product of 4 mols of ethylene oxide to 1 mol of the unsaturated $C_{22}$-amine were formed in a quantitative reaction. The pressure of the pressurized water-containing heat exchanger was adjusted to a pressure of 12.5 atmospheres and the pressure present in the reactor was adjusted to a pressure of 60 to 70 atmospheres. The peak temperature in the reactor was 325° C. and the duration of progress of the reactants in the reactor was 53 seconds. The temperature course of the reaction is shown in curve VI in FIG. 2.

The Lovibond color values of the end product, measured according to Example 1, were: yellow=9.6, red=1.5, blue=0. The color values, measured in the same way, of the starting amine admixed with 0.1% by weight of sodium were: yellow=8.2, red=1.2, blue=0.

If the same reaction is carried out in a discontinuous process according to methods known from the literature in an autoclave with the same catalyst-containing starting materials utilizing a peak temperature of 143° C. and a pressure of between 1.1 and 8 atmospheres for a reaction period of 4 hours, the resulting final product had the Lovibond color values, measured under the same conditions, yellow=23.0, red=6.6, blue=0.3.

EXAMPLE 9

Cyclohexylamine was admixed with an amount of a 30% potassium methylate solution such that the amine contained 0.05% by weight of potassium after the methanol had been evaporated in vacuum at 80° to 100°

C. The catalyst-containing amine and ethylene oxide in a mol ratio of 1:2 (weight ratio of 1.1:1) were pumped through the reactor coil at such a rate that 68.8 kg./hour of the addition product of 2 mols of ethylene oxide to 1 mol of cyclohexylamine were formed in a quantitative reaction. The pressure of the pressurized, water-containing heat exchanger was adjusted to a pressure of 14.5 atmospheres and the pressure present in the reactor was adjusted to a pressure of 75 to 85 atmospheres. The peak temperature in the reactor was 309° C. and the duration of progress of the reactants in the reactor was 36 seconds.

The Lovibond color values of the final product, measured according to Example 1, were: yellow=2.9, red=0.2, blue=0. The color values, measured the same way, of the starting amine admixed with 0.05% by weight of potassium were: yellow=2.4, red=0.1, blue=0.

EXAMPLE 10

The addition product of 2 mols of ethylene oxide to 1 mol of n-dodecylamine, obtained according to Example 3, was admixed with an amount of a 30% sodium methylate solution such that the addition product contained 0.1% by weight of sodium after the methanol had been evaporated in vacuum at 80° to 100° C. The catalyst-containing addition product and ethylene oxide in a mol ratio of 1:4 (weight ratio of 1.6:1) were pumped through the reactor coil at such a rate that 48 kg./hour of the addition product of 6 mols of ethylene oxide to 1 mol of n-dodecylamine were formed in a quantitative reaction. The pressure of the pressurized, water-containing heat exchanger was adjusted to a pressure of 10.5 atmospheres, and the pressure present in the reactor was adjusted to a pressure of 60 to 70 atmospheres. The peak temperature in the reactor was 327° C. and the duration of progress of the reactants through the reactor was 50 seconds. The temperature course of the reaction is shown in curve VII in FIG. 2.

The Lovibond color values of the final product, measured according to Example 1, were: yellow=5.1, red=0.9, blue=0. The color values, measured the same way, of the starting product admixed with 0.1% by weight of sodium were: yellow=4.2, red=0.8, blue=0.

The advantages obtainable by means of the invention consist, in particular, in the fact that the ethoxylation products of amine-nitrogen-containing organic substances have become accessible in a continuous process with high space-time yields with a simultaneous improvement of the quality of the products of the process.

The preceding specific embodiments are illustrative of the practice of the invention. It is to be understood, however, that other expedients known to those skilled in the art may be employed without departing from the spirit of the invention or the scope of the appended claims.

We claim:
1. A process for the continuous production of addition products of ethylene oxide with amines which consists essentially of the steps of (a) continuously passing a mixture of (1) organic compounds having reactive hydrogen atoms selected from the group consisting of aliphatic primary and secondary amines having from 6 to 22 carbon atoms, said aliphatic groups being selected from the group consisting of alkyl and alkenyl, cyclohexylamine, and phenyl-lower alkyl amine having 7 to 12 carbon atoms, addition products of ethylene oxide thereof, addition products of propylene oxide thereof, and addition products of butylene oxide thereof, with (2) ethylene oxide in a molar ratio of 1:1 to 1:6 under a pressure at which the reaction mixture is kept in liquid form, through a jacketed reactor having a small cross-section compared to its length, (b) heating said mixture to such a degree that, after passage through the first half of said jacketed reactor, a maximum temperature of 240° C. is attained, and that in the second half of said jacketed reactor, said mixture attains a maximum temperature of between about 250 to 360° C., (c) maintaining said mixture in said jacketed reactor for about 10 to 150 seconds whereby an addition product is formed, (d) maintaining the interval between the obtention of said highest maximum temperature and the time said mixture leaves said jacketed reactor between about 5% to 30% of the total duration of time said mixture is maintained in said jacketed reactor, (e) immediately cooling said addition product to a temperature below 150° C. after said addition product leaves said jacketed reactor, and (f) recovering said addition product.

2. The process of claim 1, step (a), wherein said molar ratio of said organic compounds to ethylene oxide is between 1:1 and 1:4.

3. The process of claim 1, step (c), wherein said mixture is maintained in said jacketed reactor for between about 20 to 100 seconds.

4. The process of claim 1 wherein said organic compound having reactive hydrogen atoms is a primary alkyl amine having 6 to 22 carbon atoms.

5. The process of claim 1 wherein said organic compound having reactive hydrogen atoms is a secondary alkylamine having 6 to 22 carbon atoms.

6. The process of claim 1 wherein said organic compound having reactive hydrogen atoms is a primary alkenyl amine having 6 to 22 carbon atoms.

7. The process of claim 1 wherein said organic compound having reactive hydrogen atoms is cyclohexylamine.

8. The process of claim 1 wherein said organic compound having reactive hydrogen atoms is an ethoxylated primary alkyl amine having 6 to 22 carbon atoms.

9. The process of claim 1 wherein said organic compound having reactive hydrogen atoms is a phenyl-lower alkyl amine having 7 to 12 carbon atoms.

References Cited

FOREIGN PATENTS

| | | | |
|---|---|---|---|
| 1,365,945 | 5/1964 | France | 260—584(B) |
| 855,111 | 11/1952 | Germany | 260—584(B) |

CHARLES B. PARKER, Primary Examiner

R. L. RAYMON, Assistant Examiner

U.S. Cl. X.R.

260—570.8, 570.9, 584